March 19, 1929. W. S. HARDEN ET AL 1,706,228
GRAVITY OIL FILTER
Filed April 7, 1927
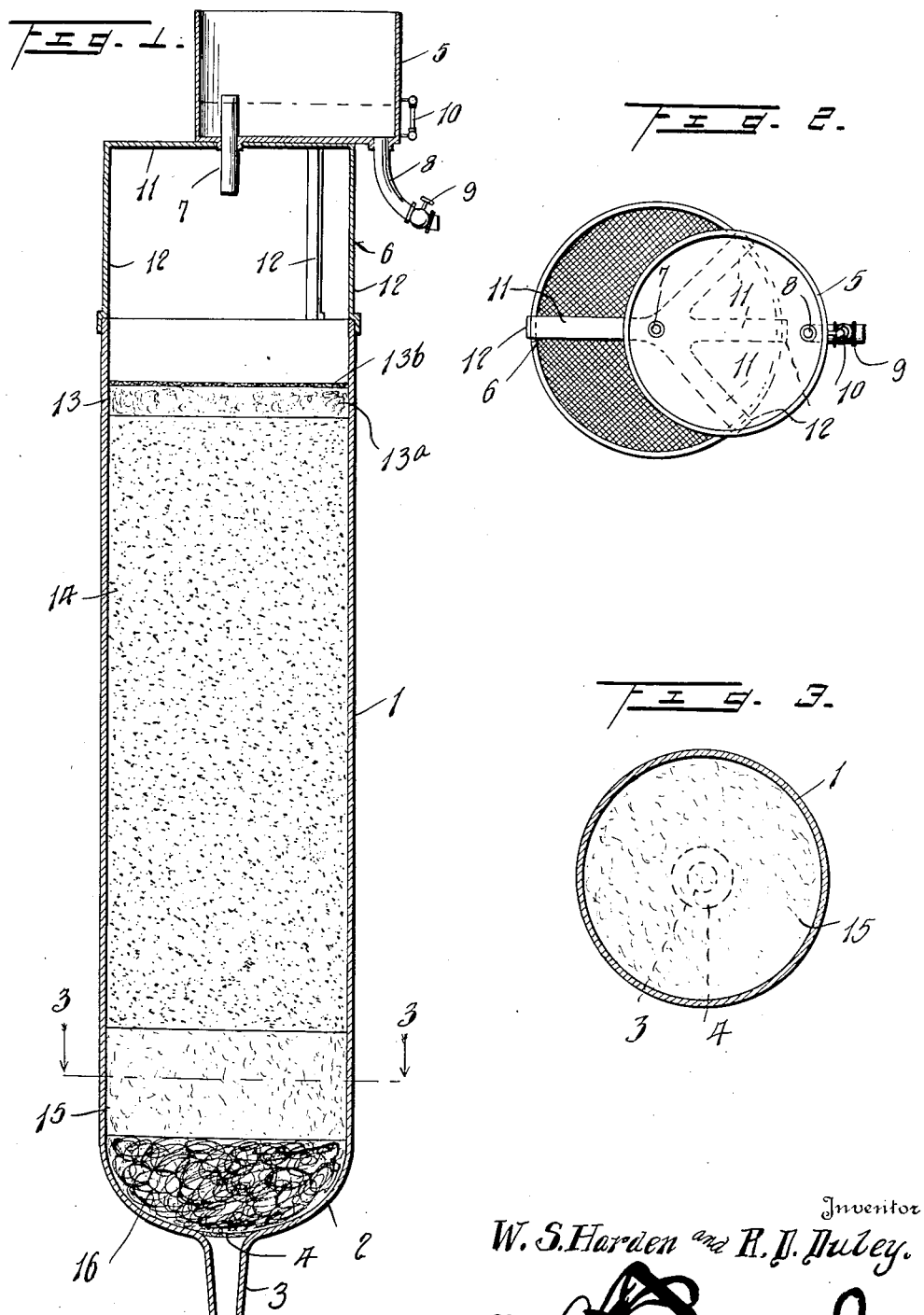

Patented Mar. 19, 1929.

1,706,228

UNITED STATES PATENT OFFICE.

WILLIAM S. HARDEN AND ROY D. DULEY, OF STANBERRY, MISSOURI.

GRAVITY OIL FILTER.

Application filed April 7, 1927. Serial No. 181,775.

This invention relates to a filter for reclaiming the waste lubricating oils from internal combustion engines and other machines, and has for one of its objects to provide a device of this character which shall be adapted to remove all foreign matter from the waste oils and to restore the oils to their original color and quality and which shall be simple and inexpensive and capable of being maintained at a high state of efficiency at small cost.

With the foregoing and other objects in view, the nature of which will become apparent as the description proceeds, the invention consists of the construction, combination and arrangement of parts hereinafter fully described and claimed, and illustrated in the accompanying drawing, wherein:

Figure 1 is a sectional view taken on a plane extending vertically and centrally through the filter, Figure 2 is a top plan view of the filter, and Figure 3 is a sectional view taken on the horizontal plane indicated by the line 3—3 of Figure 1.

The filter comprises a casing 1 which may oe cylindrical as shown or of any other suitable formation. The top of the casing 1 is fully open, and the bottom 2 thereof is of substantially semi-spherical formation. A discharge spout 3 extends centrally from the bottom 2, and a screen 4 extends across the upper or intake end thereof.

The oil to be filtered is first poured into a receptacle 5 which is supported above the casing 1 and at one side of the upper end of the casing by a bracket 6 and which has its top fully open. The receptacle 5 is provided with an oil discharge spout 7 which extends through and above and below the bottom thereof, and with a water discharge spout 8 which extends downwardly and outwardly from the bottom thereof and is provided with a valve 9. As the spout 7 extends above the bottom of the receptacle 5, most of the water in the oil will accumulate in the receptacle below the upper or intake end of the spout, and the water may be withdrawn from the receptacle from time to time by opening the valve 9. A gauge glass 10 is mounted on the receptacle 5 to permit the water level in the receptacle to be ascertained. The bracket 6 comprises a top bar 11 upon which the receptacle 5 is mounted and to which it is secured, and legs 12 which are removably engaged with the casing 1.

After leaving the spout 7 the oil passes through several successive filtering elements 13, 14, 15 and 16 which are arranged within the casing 1. The filtering element 13 consists of cotton or woolen cloth felt 13$^a$ and a cloth or metal sieve 13$^b$, the former being positioned below the latter. Substantially all the water that it not removed from the oil during its passage through the receptacle 5, is removed therefrom during its passage through this filtering element. The filtering element 14 consists of an earthy substance which may be baked, charred or dried and which may be certain kinds of top soils or lower soils or clays or shales and the like. During the passage of the oil through this filtering element, certain portions of its solid contents such as metal particles, flaked carbon and the like are removed therefrom. The filtering element 15 may consist of wood or vegetable fibre which is pulverized or ground to the consistency of fine saw dust. Any water remaining in the oil after its passage through the receptacle 5 and filtering elements 13 and 14, will be removed therefrom during its passage through the filtering element 15. The filtering element 16 may consist of cotton or wool batting, cotton, wool, sisal flax or other suitable vegetable fibre reduced to a state in which it resembles waste used by machinists. The filtering element 15 is more compact than the filtering element 16, and the latter is adapted to remove any foreign matter that the oil may contain after its passage through the receptacle 5, and filtering elements 13, 14 and 15. The vertical dimension of the filtering element 14 is greater than the combined corresponding dimensions of the other filtering elements. As the receptacle 5 is supported above and at one side of the open upper end of the casing 1, the sieve 13$^b$ may be cleaned from time to time without removing it from the casing and interrupting the operation of the filter.

From the foregoing description, taken in connection with the accompanying drawing, it should be apparent that during the passage of the oil through the filter all foreign matter will be removed from it and it will be restored to its original color and quality, and that the oil passes through the filter by force of gravity.

It should be understood that the drawing is merely illustrative and does not pretend to give exact proportions. Furthermore, the said drawing is illustrative of a preferred construction, it being our expectation that various changes and modifications may be made without departing from the spirit and scope of our invention.

What is claimed is:—

A filter comprising a casing fully open at its upper end, filtering elements arranged within the casing, a bracket having a top bar and legs removably engaged with the upper end of the casing and supporting the top bar above and across the casing, a receptacle secured upon the top bar at one side of said end of the casing, and a discharge pipe for the receptacle extending above and below the bottom thereof.

In testimony whereof we affix our signatures.

WILLIAM S. HARDEN.
ROY D. DULEY.